United States Patent
Cooper et al.

(10) Patent No.: US 11,322,866 B2
(45) Date of Patent: May 3, 2022

(54) ULTRASONIC WELDED CABLE FOR A WELDING SYSTEM

(71) Applicant: ELCO ENTERPRISES, INC., Jackson, MI (US)

(72) Inventors: Edward L. Cooper, Clarklake, MI (US); Alexander Khakhalev, Mt. Pleasant, MI (US); Steven J. Hayes, Addison, MI (US)

(73) Assignee: ELCO ENTERPRISES, INC., Jackson, MI (US)

( * ) Notice: Subject to any disclaimer, the term of this patent is extended or adjusted under 35 U.S.C. 154(b) by 0 days.

(21) Appl. No.: 16/761,478

(22) PCT Filed: Nov. 2, 2018

(86) PCT No.: PCT/US2018/058896
§ 371 (c)(1),
(2) Date: May 4, 2020

(87) PCT Pub. No.: WO2019/090043
PCT Pub. Date: May 9, 2019

(65) Prior Publication Data
US 2020/0395692 A1    Dec. 17, 2020

Related U.S. Application Data

(60) Provisional application No. 62/668,472, filed on May 8, 2018, provisional application No. 62/581,381, filed on Nov. 3, 2017.

(51) Int. Cl.
*H01R 11/12*    (2006.01)
*H01R 4/02*    (2006.01)
*H01R 4/22*    (2006.01)
*H01R 4/30*    (2006.01)
(Continued)

(52) U.S. Cl.
CPC ............ *H01R 11/12* (2013.01); *H01R 4/021* (2013.01); *H01R 4/023* (2013.01); *H01R 4/22* (2013.01);
(Continued)

(58) Field of Classification Search
CPC .............................. H01R 11/12; H01R 4/023
See application file for complete search history.

(56) References Cited

U.S. PATENT DOCUMENTS

| | | | | |
|---|---|---|---|---|
| 4,487,990 A | * | 12/1984 | Lane | H01R 9/11 174/15.7 |
| 4,830,557 A | * | 5/1989 | Harris | F16B 37/044 411/112 |

(Continued)

FOREIGN PATENT DOCUMENTS

| | | |
|---|---|---|
| DE | 102007031592 A1 | 3/2008 |
| DE | 102011089207 A1 | 6/2013 |

(Continued)

OTHER PUBLICATIONS

International Search Report and Written Opinion of PCT/US2018/058896, dated Jan. 29, 2019.

*Primary Examiner* — Ross N Gushi
(74) *Attorney, Agent, or Firm* — Dickinson Wright PLLC

(57) ABSTRACT

A system for transmitting power and current includes a power cable having stranded wires and an exposed end. The stranded wires are ultrasonically welded together. Ultrasonically welding the wires creates a bundle of wires at the exposed end that may be free from air pockets, reducing oxidation and improving the current path through the cable.

19 Claims, 12 Drawing Sheets

(51) Int. Cl.
*B23K 101/32* (2006.01)
*B23K 103/12* (2006.01)
*B23K 101/38* (2006.01)
*B23K 9/32* (2006.01)
*B23K 20/10* (2006.01)

(52) U.S. Cl.
CPC ................ *H01R 4/30* (2013.01); *B23K 9/323* (2013.01); *B23K 20/10* (2013.01); *B23K 2101/32* (2018.08); *B23K 2101/38* (2018.08); *B23K 2103/12* (2018.08)

(56) References Cited

U.S. PATENT DOCUMENTS

| | | | |
|---|---|---|---|
| 5,298,710 A | 3/1994 | Acheson et al. | |
| 7,033,233 B2 * | 4/2006 | Fujimoto | B23H 11/006 439/874 |
| 9,011,188 B2 * | 4/2015 | Aoki | H01R 43/0207 439/874 |
| 9,550,252 B2 * | 1/2017 | Takayashiki | H01R 4/023 |
| 2008/0032569 A1 * | 2/2008 | Steiner | B23K 20/10 439/874 |
| 2008/0265004 A1 | 10/2008 | Stroh | |
| 2011/0048763 A1 | 3/2011 | Schloms et al. | |
| 2011/0198122 A1 | 8/2011 | Sagawa et al. | |
| 2015/0249294 A1 | 9/2015 | Iio et al. | |

FOREIGN PATENT DOCUMENTS

| | | |
|---|---|---|
| JP | S62140308 A | 6/1987 |
| KR | 20110005512 U | 6/2011 |
| WO | 2011076515 A1 | 6/2011 |
| WO | 2016054516 A1 | 4/2016 |

* cited by examiner

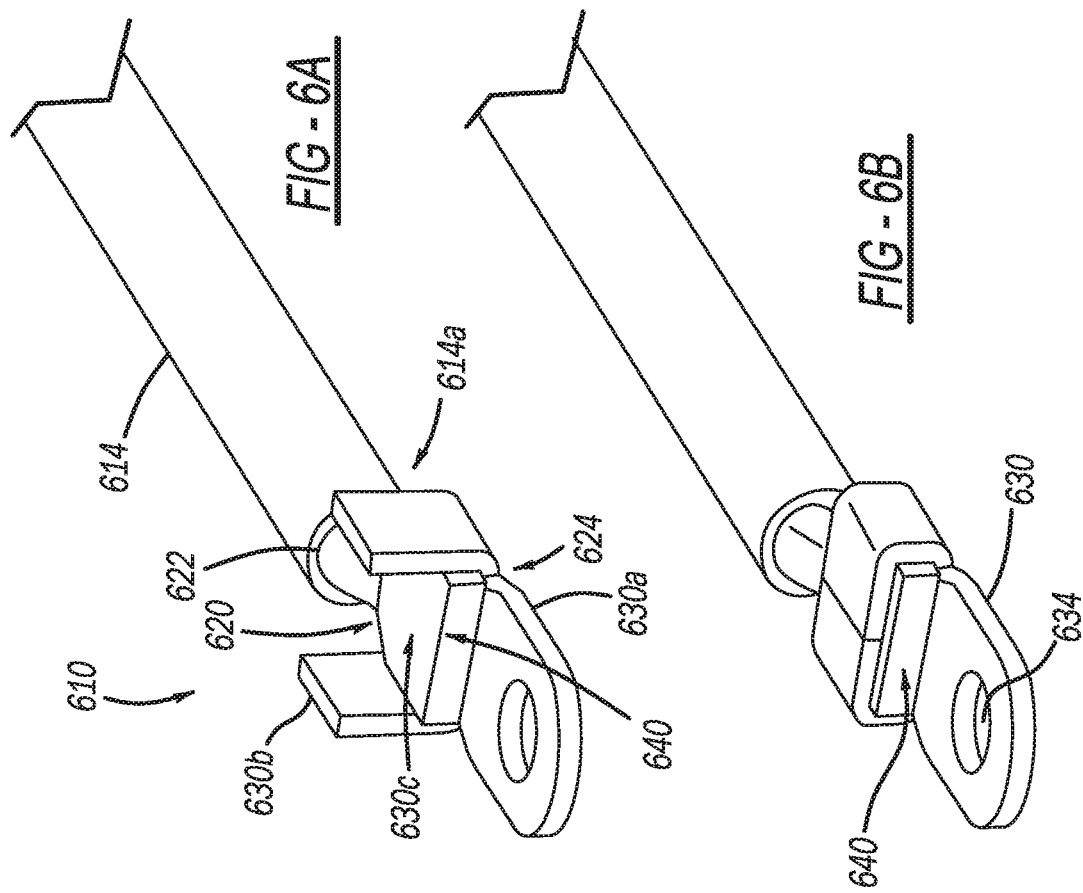
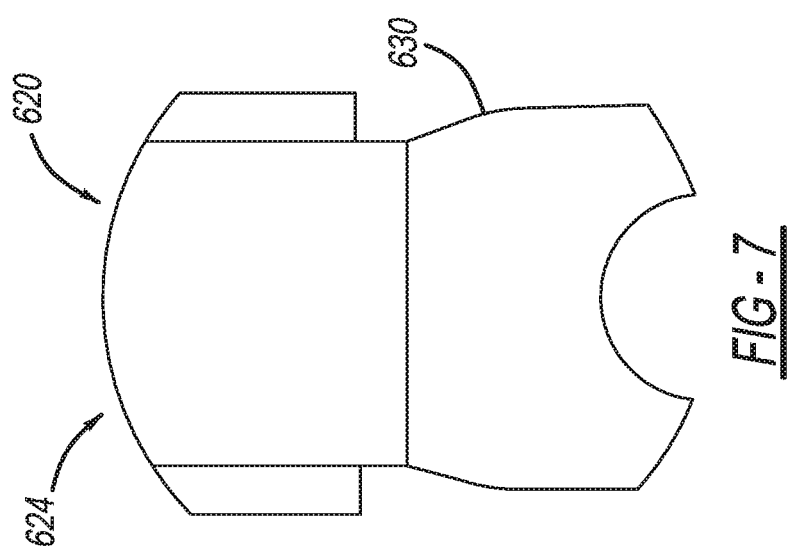

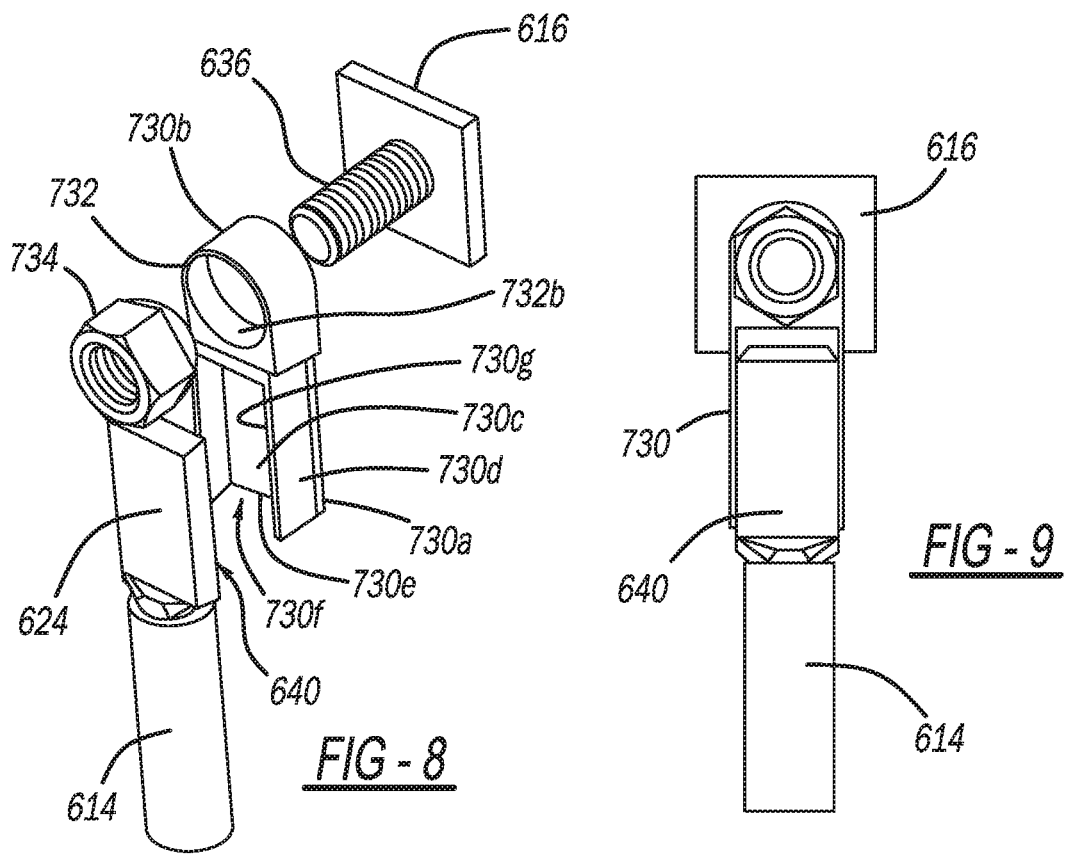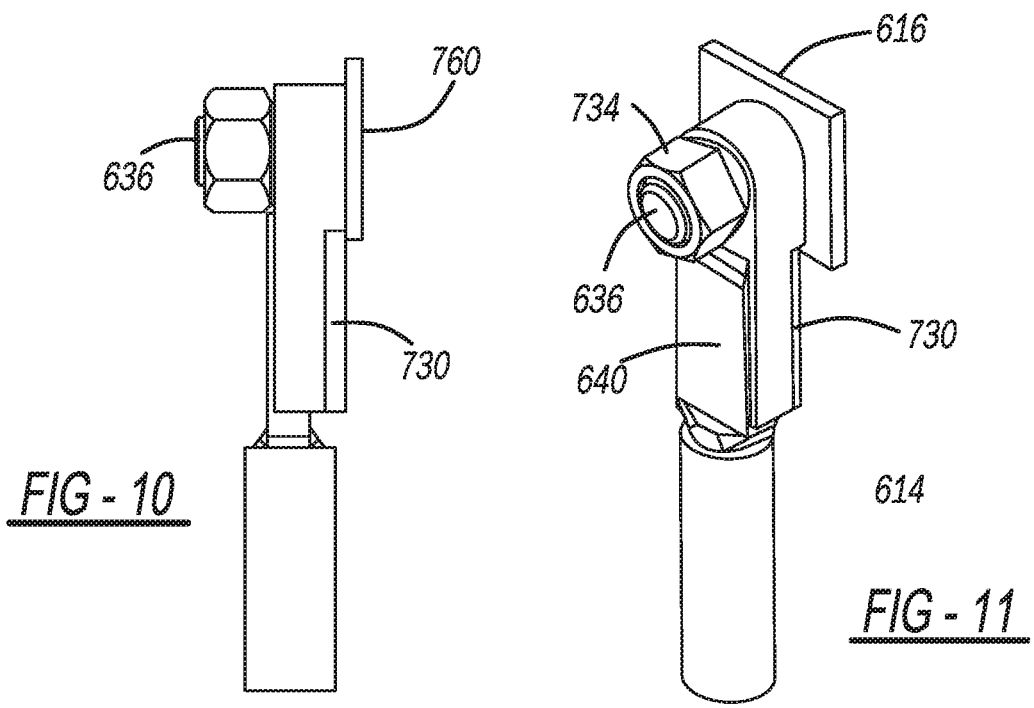

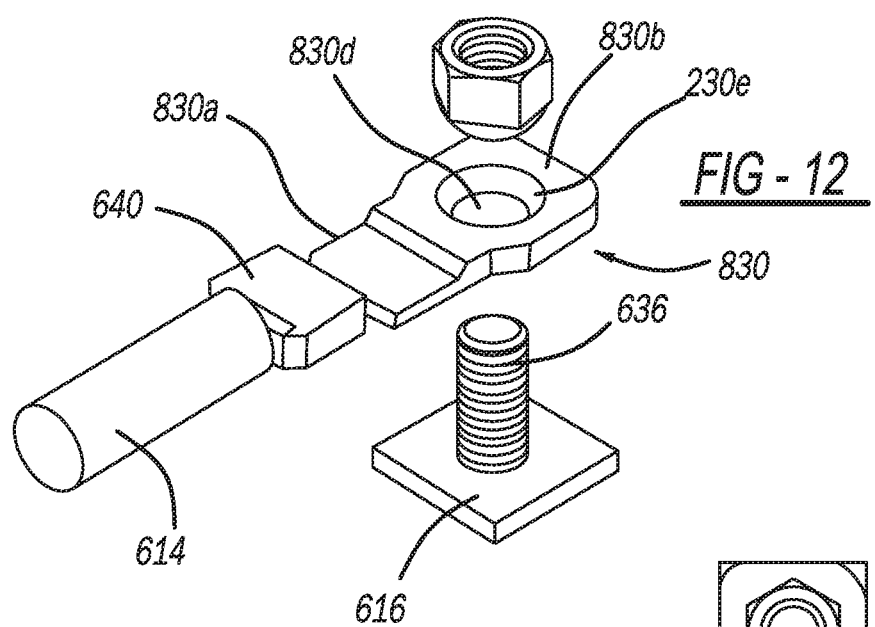
FIG - 12
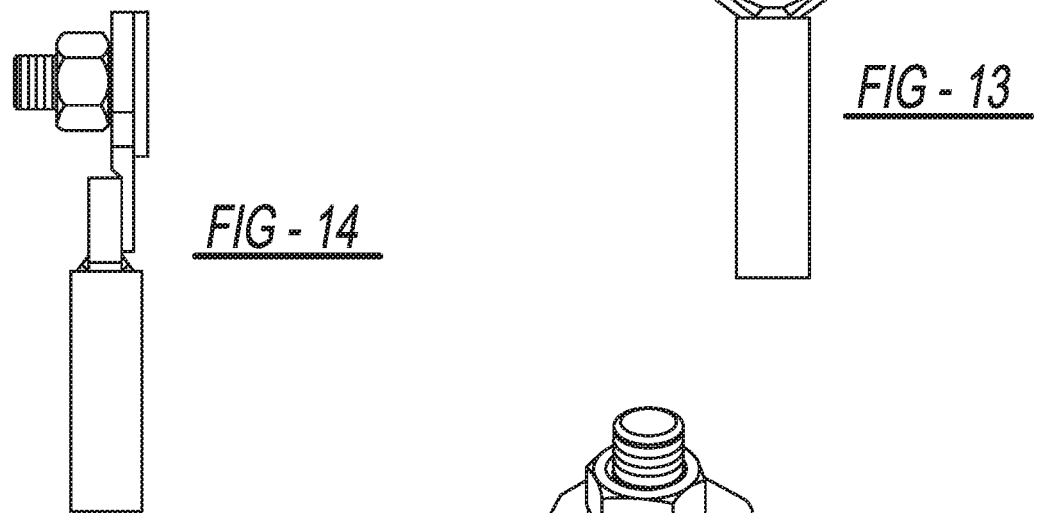
FIG - 14
FIG - 13
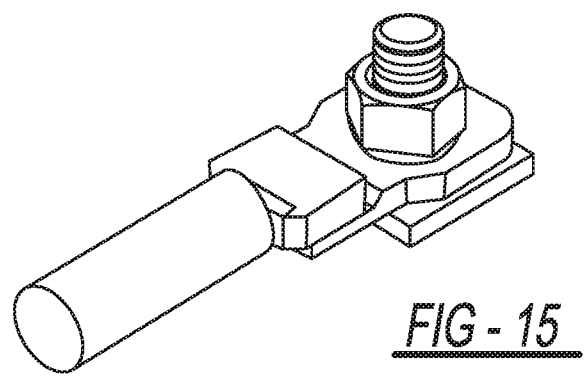
FIG - 15

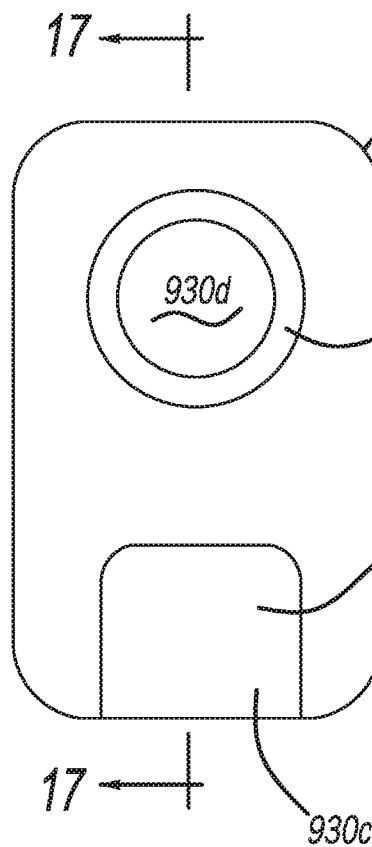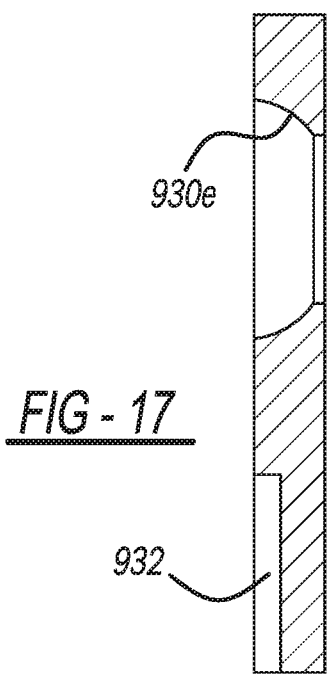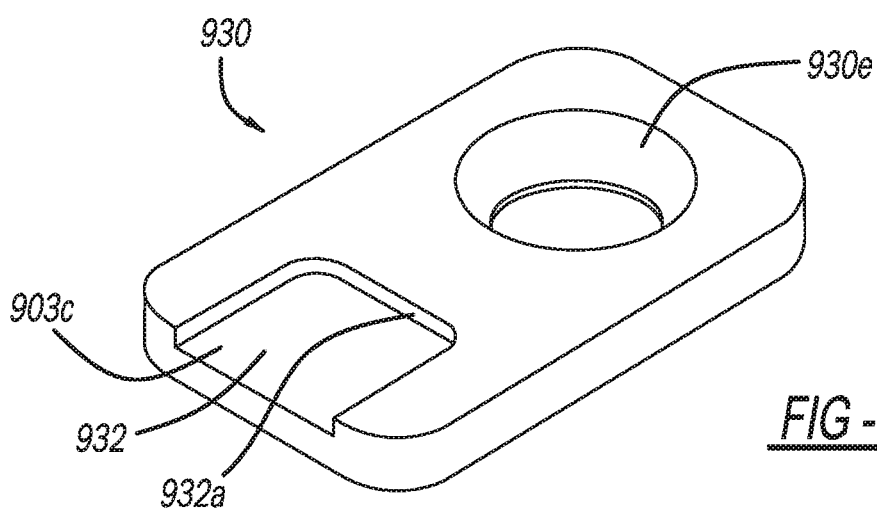

ULTRASONIC WELDED CABLE FOR A WELDING SYSTEM

CROSS-REFERENCE TO RELATED APPLICATIONS

This application is a 35 U.S.C. § 371 national phase of PCT International Application No. PCT/US2018/58896, filed Nov. 2, 2018, which claims the benefit of priority under 35 U.S.C. § 119 to U.S. Provisional Patent Application No. 62/581,381 filed Nov. 3, 2017, and U.S. Provisional Patent Application No. 62/668,472 filed May 8, 2018, the contents of both are herein incorporated by reference in their entirety.

BACKGROUND

Power cables are known in the art for providing current from a power source to an end user. Welding systems include the use of power cables to transfer current from a power source to a welding system that includes a welding gun and a consumable electrode.

Electrical cables make a number of connections along the flow path of the current. Cables may be connected to other structure for transmitting the current, and cables will be designed to terminate at an end of the cable such that the cable may be easily connected to structure upstream of downstream from the cable along the current path.

One type of power cable includes the use of wire strands that are held together and wrapped within an outer jacket to retain the wire strands. The wire strands may be twisted together to increase the connectivity between the strands to efficiently transmit current through the cable. The material of the cable can vary, although one type of material can be copper stranded wire.

To terminate the cable, an end lug may be mechanically connected to an end of the cable. Crimping is an easy way to quickly terminate the cable and prepare it for being connected to further structure. However, over time the crimped connection may weaken, and the material of the joint will creep. This can readily occur in situations with high current thermocycling, such as in a welding operation.

Thus, a connection that may have good electrical and thermal characteristics after crimping may ultimately loosen, which can ultimately lead to electrical and thermal losses.

In the case where a high crimping force crimp is achieved initially, the wire strands will be bundled together tightly. However, even in this case, there are still a number of air pockets that remain between the strands. A high current cable may have approximately 1600 strands of wire, and will thereby include a high number of air pockets. The existence of air pockets can lead to accumulated moisture and acids and can lead to joint corrosion.

Another type of terminating a cable is in the form of soldering. A soldered connection may be more robust than a crimped connection in some cases and are less likely to loosen over time. However, soldered connections still include a high number of air pockets. Moreover, solder material may itself degrade over time and can also corrode over the life of the connection.

Accordingly, improvements can be made in the termination of electrical cables.

SUMMARY

A welding system includes a gooseneck, a diffuser sleeve, a contact tip positioned in an inner cavity of the diffuser sleeve, and a power pin assembly connected to an end of the welding cable. The power pin assembly defines a passageway therethrough and is configured to receive an electrode and welding gas. The power pin assembly is further configured to connect with a power source for supplying current to the welding system through the power pin assembly. The power pin assembly includes a power source pin attached to the first end of the welding cable and a power source lug coupled to the power source pin. A multi-stranded wired cable having a cable end is in electrical communication with power source lug. The cable end of the multi-stranded wire is consolidated via an ultrasonic welding process.

BRIEF DESCRIPTION OF THE DRAWINGS

FIG. 6 is an isometric view of a cable with exposed wires ultrasonically welded to a lug, showing tabs of the lug both before and after being crimped over the ultrasonically welded exposed wires;

FIG. 7 is a top view of the wires ultrasonically welded to the lug;

FIG. 8 is an exploded view of an alternative lug with a radiused inner surface at the top of a through-bore, a power connection having a threaded protrusion, a ball nut, and a bundled end of the wires of the cable;

FIG. 9 is a top and rear view of an assembled state of the components of FIG. 3;

FIG. 10 is a side view of the assembly of FIG. 9;

FIG. 11 is an isometric view of the assembly of FIG. 9;

FIG. 12 is an exploded view of another lug with a radiused inner surface at the through-bore, the power connection having the threaded protrusion, the ball nut, and the bundled end of the wires of the cable;

FIG. 13 is a top view of an assembled state of the components of FIG. 12;

FIG. 14 is a side view of the assembly of FIG. 12;

FIG. 15 is an isometric view of the assembly of FIG. 12;

FIG. 16 illustrates a top view of a lug that has a generally flat and rectangular shape with a first end portion;

FIG. 17 is a side view of the lug of FIG. 16;

FIG. 18 is an isometric view of the lug of FIG. 16

DETAILED DESCRIPTION

Figure 1:
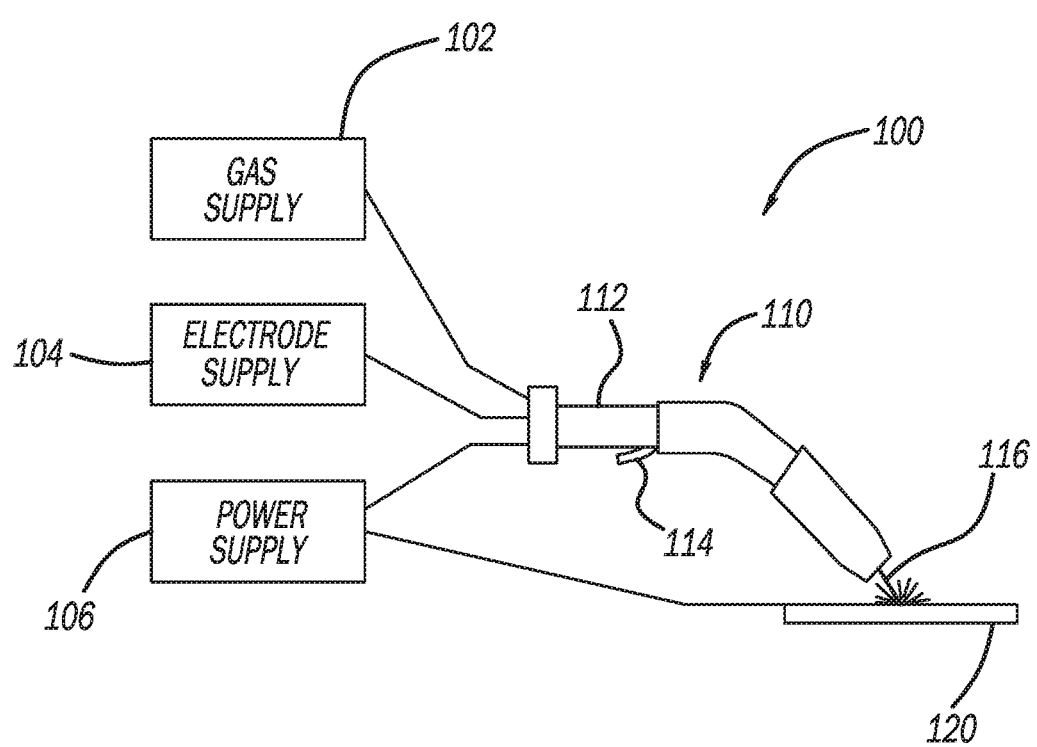
FIG. 1 illustrates a block diagram of a MIG welding system.

FIG. 1 is a general, schematic representation of a MIG welding system 100. The welding system 100 includes a gas supply 102, an electrode supply 104, and a power supply 106. In general, the welding device 100 includes a handle 112, a gooseneck 110, and an end assembly. The welding system 100 also includes an activation switch which, in one embodiment, is a trigger 114 on the handle 112 of the welding system 100. It is understood that the welding system 100 can be activated similar to any welding system well known in the art.

Figure 2A:
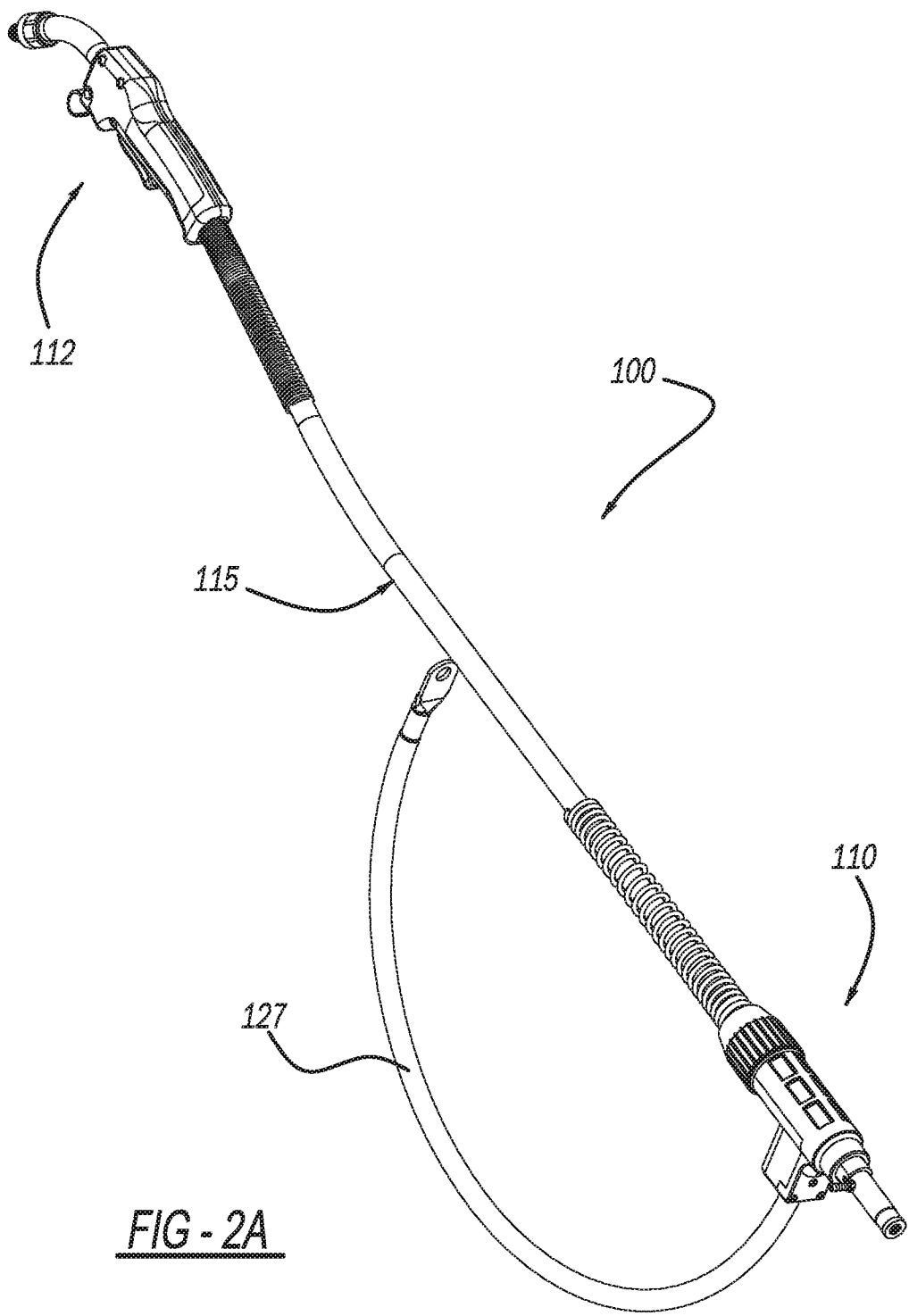
FIGS. 2A-2C illustrate one embodiment of a MIG welding system.
Figure 2B:
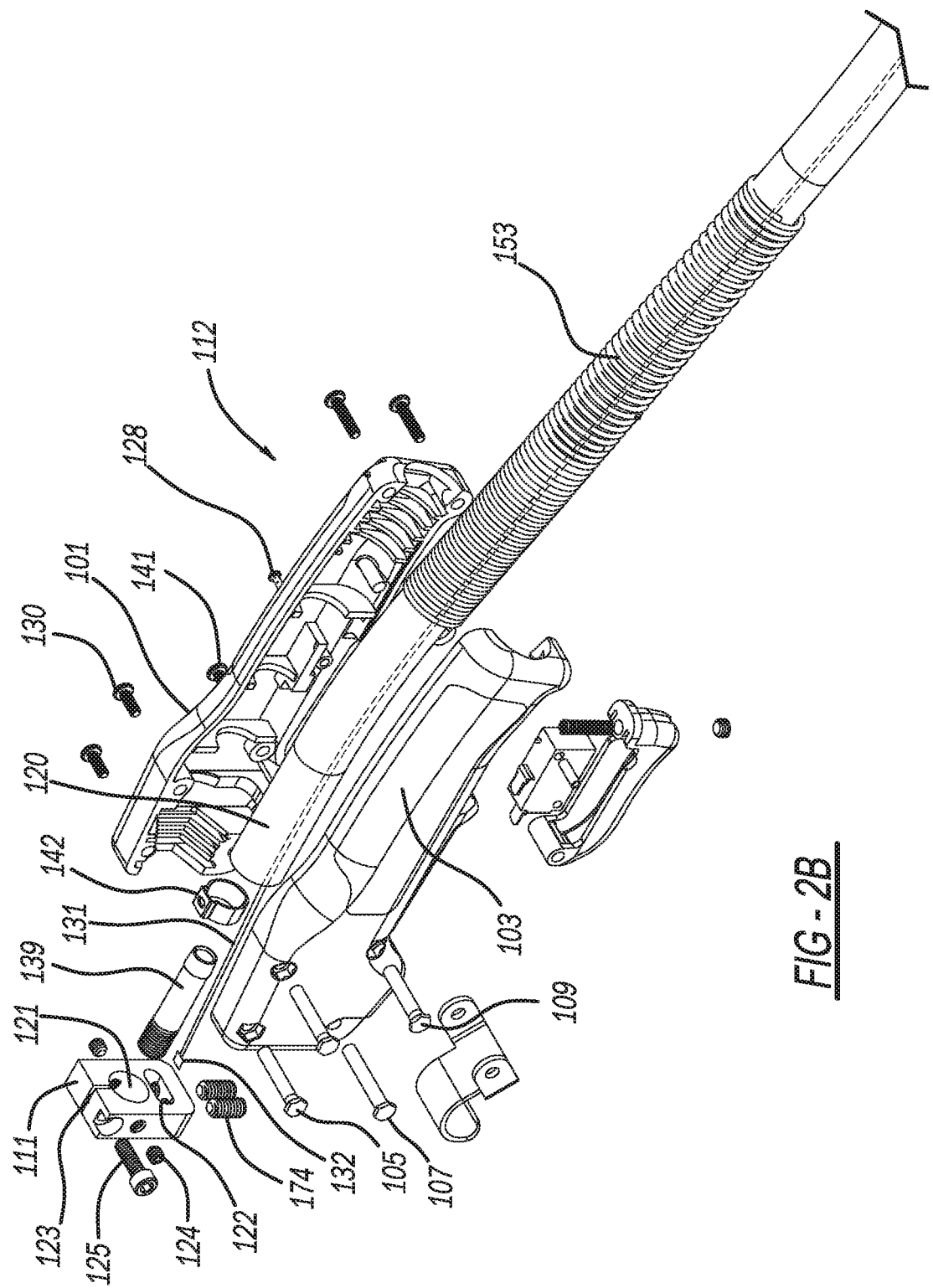

With reference to FIGS. 2A and 2B, the welding system 100 includes a welding cable 115 extending from the handle assembly 112 to a power pin assembly 116. The power pin assembly 116 is connected to the power supply 106 of FIG. 1.

With a focus on FIG. 2B, a more detailed view of the handle assembly 112 is shown. Here, the handle 112 assembly includes a right handle housing 101 and a left handle housing 103. Generally, the housings 101 and 103 may be made of plastic, but it should be understood that any suitable material may be utilized to form the housings 101 and 103. A plurality of screws 128, 130, 141 are configured to mate with a plurality of binding posts 105, 107 and 107. The mating of the screws 128, 130, 141 to the binding posts 105, 107 and 107 essentially attaches the right-hand housing 101 to the left-hand housing 103.

Substantially located within the right-hand housing 101 and the left-hand housing 103, is the welding cable 153 having a cable end 120. At the cable end 120 is a gas fitting 139 that is configured to mate with the cable end 120 by using a spade connector 142. A power block 111 contains a substantially cylindrical cavity 121 for receiving the gas fitting 139.

The power block 111 also includes an elongated cavity 122 for receiving a cable end 132 of a power cable 131 that will be described later in this description. In order for the gas fitting 139 to properly couple with the power block 111, a screw 125 is inserted through a portion of the power block 111. The power block 111 includes a small slot 123 that will close when the screw 125 is appropriately screwed into place. This closing of the slot 123 essentially causes the cavity 121 to squeeze around the gas fitting 139. A set screw 124 can also be utilized so as to properly position the gas fitting 139 before the screw 125 is screwed into place.

As stated before, the cable end 132 of the power cable 131 will be inserted into the elongated cavity 122. The power cable 131 may be a multistranded cable made up of conductive material, such as copper. The cable end 132 is consolidated using an ultrasonic welding procedure, which consolidates the strands at the cable end 132 of the power cable 131. The cable end 132 may be shaped as a cuboid. It should be understood that the cable end 132 may be any shape, not just a cuboid. For example, the cable end 132 may be a be a cube, cuboid, triangular prism, pentagonal prism, hexagonal prism, cylinder, and the like. Again, it should be understood that any type of shape could be utilized. A more detailed description of this power cable 131 and the consolidated cable end 132 will be made in the paragraphs that follow and in FIGS. 4A-4C One or more screws 174 are then provided and screwed through the power block 111 so as to engage the cable end 132 of the power cable 131 located within the elongated cavity 122. By so doing, the screws 174 essentially hold the cable end 132 of the power cable 131 in place so that the cable 131 is fixedly attached to the power block 111.

The handle 112 may also include a hanger that is held in place using the post and set screw. The hanger is shaped so as to allow the handle 112 to hang from an exterior object.

In order to actuate the handle 112, a trigger housing is provided. The trigger housing includes a switch and bushing that, when actuated using the trigger housing, will allow the MIG welding assembly to be utilized. This essentially allows both the flow of gas and electricity so as to perform a MIG welding operation. One or more springs may be utilized so as to provide some physical feedback to the trigger housing and prevent the trigger from being accidentally actuated.

Figure 2C:
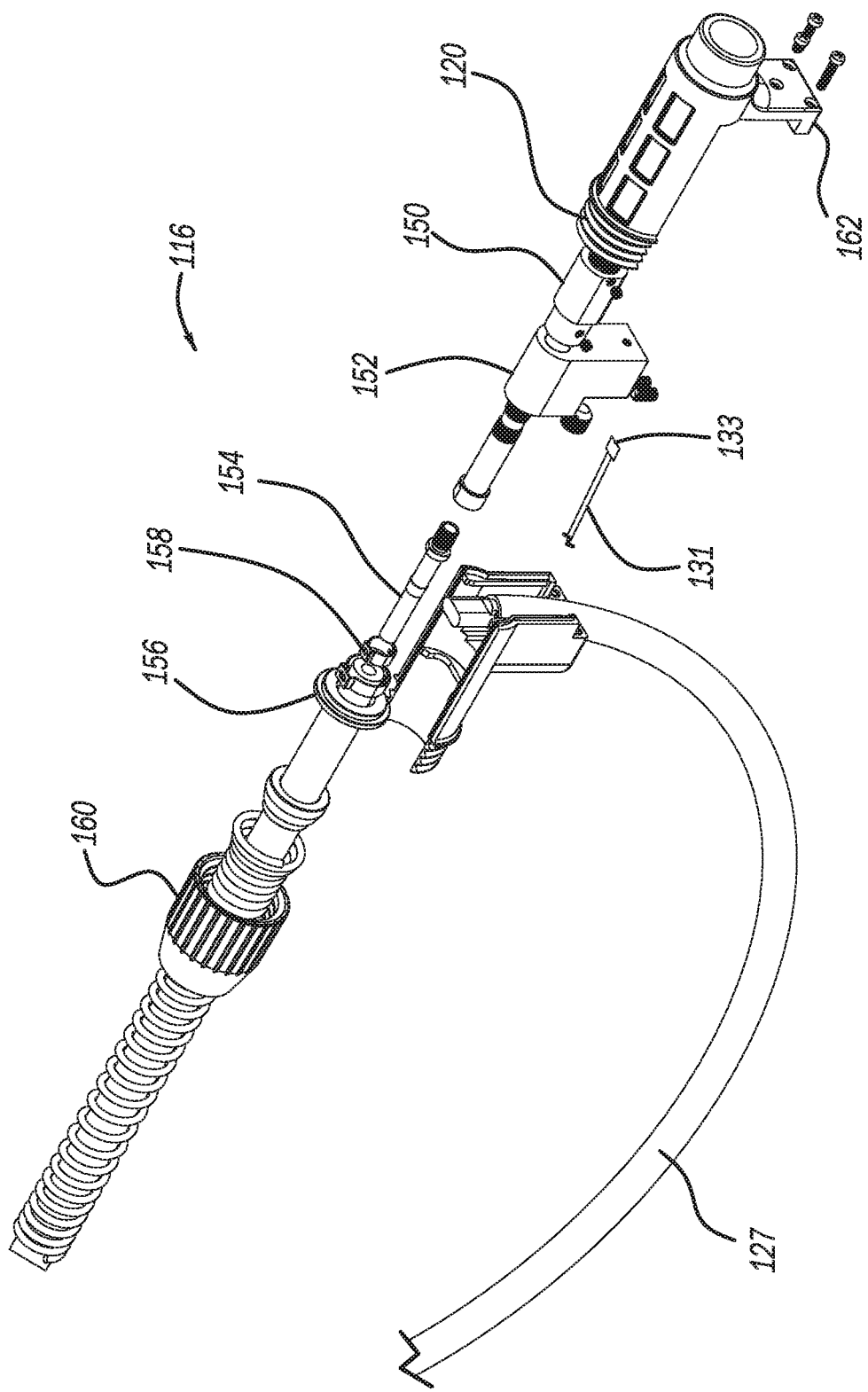

Referring to FIG. 2C, a more detailed view of the power pin assembly 116 of the MIG welding assembly is shown. Here, gas is fed into a power pin adaptor 150, which is mated to a power block 152. The cable 131 has a cable end 133 that generally opposes the cable end 132 of the cable 131 of FIG. 2B.

Here, the cable end 133 is configured to mate with the power block 151. The cable end 133 may be formed utilizing techniques similar to the ones described in forming the cable end 132. For example, the cable 131, as stated previously, may be a multithreaded wire made of a conductive material, such as copper. The threads at the cable end 133 may be consolidated to each other utilizing an ultrasonic welding technique, which will be described and shown in FIGS. 4A-4C.

The power block 152 provides the gas and electricity to the power source pin, which in turn provides the gas to a feeder adaptor 154. The feeder adaptor 154 is held to the cable using a power pin cable retainer 156 and a spade connector 158. The power pin cover nut 160 engages a power pin cover 162 utilizing a threaded connector 126. A cable 127, connected to a power source, is shown that mates with the power block 152 as will be described in FIG. 3.

Figure 3:
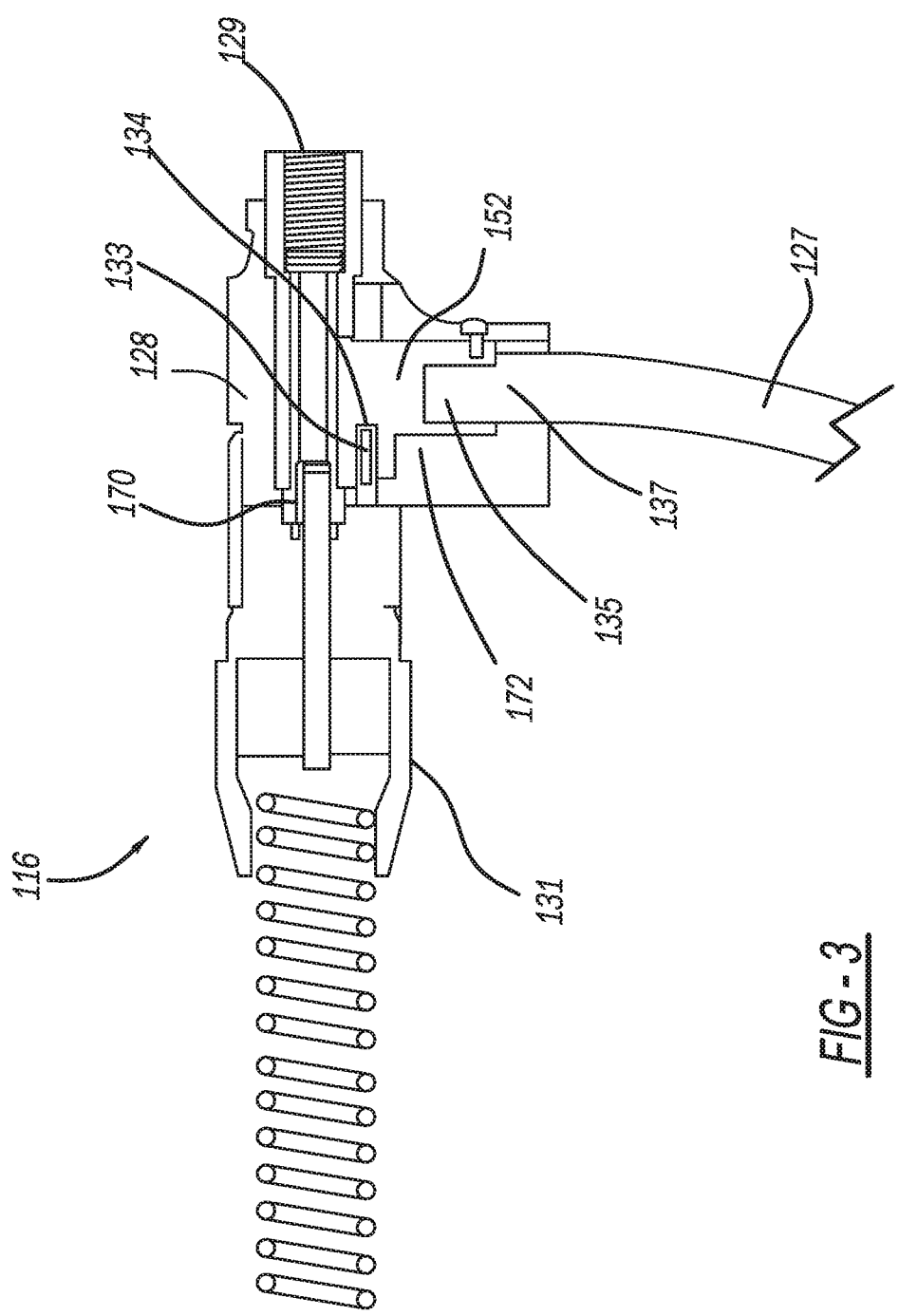
FIG. 3 illustrates a cutaway view of the power pin assembly.

Referring to FIG. 3, a cutaway view of the power pin assembly 116 is shown. Here, the power block 152 is shown to have a cylindrical pass through 128 for allowing the power pin 170 to pass therethrough. A threaded connection 129 is configured to connect to a threaded connector for receiving gas.

The power block 152 also includes a first elongated cavity 134 and a second elongated cavity 135. The elongated cavity 134 is configured to allow the cable end 133 of the cable 131 to be inserted within the elongated cavity 134. One or more set screws can be utilized so as to fixedly attach the cable end 133 of the cable 131 to the power block 152.

The second elongated cavity 135 is configured to allow a cable end 137 of the cable 127 to mate with the power block 152. A flat point set screw 172 can then be utilized so as to physically engage the cable end 133 of the cable 127 so as to hold the cable end 132 in the correct position within the cavity 135 of the power block 152.

Figure 4A:
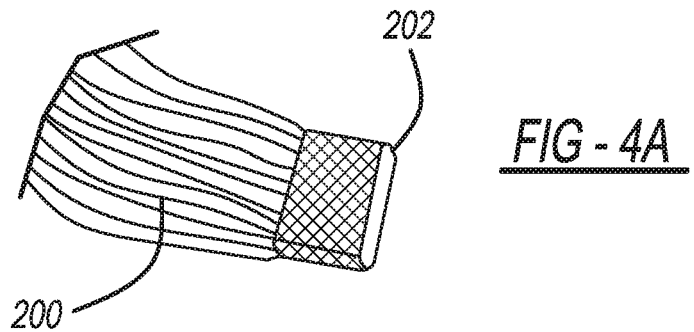
FIGS. 4A-4C illustrate a more detailed view of the cables end utilized in the MIG welding system.
Figure 4B:
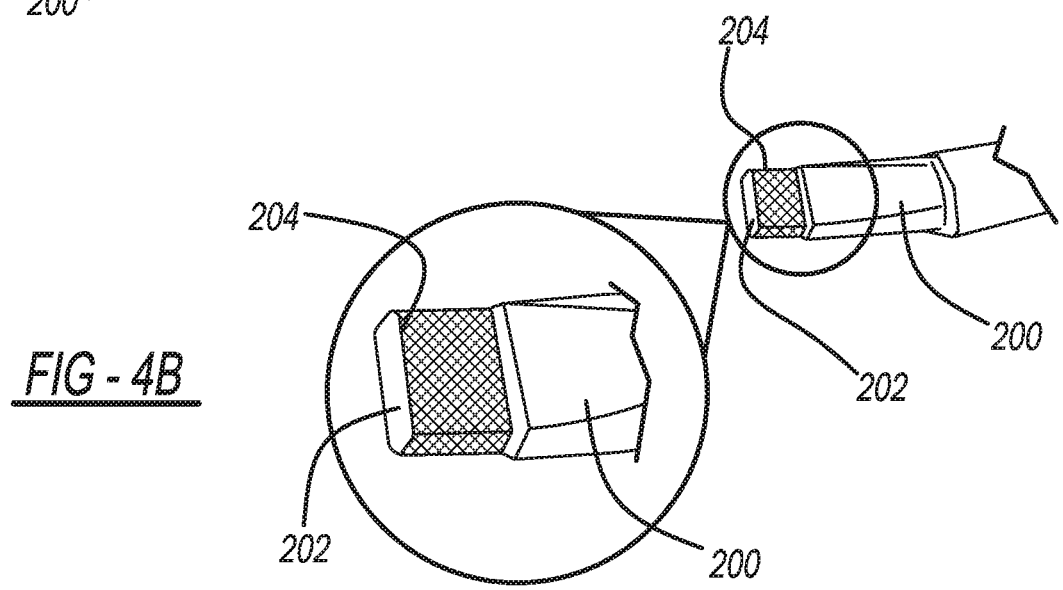
Figure 4C:
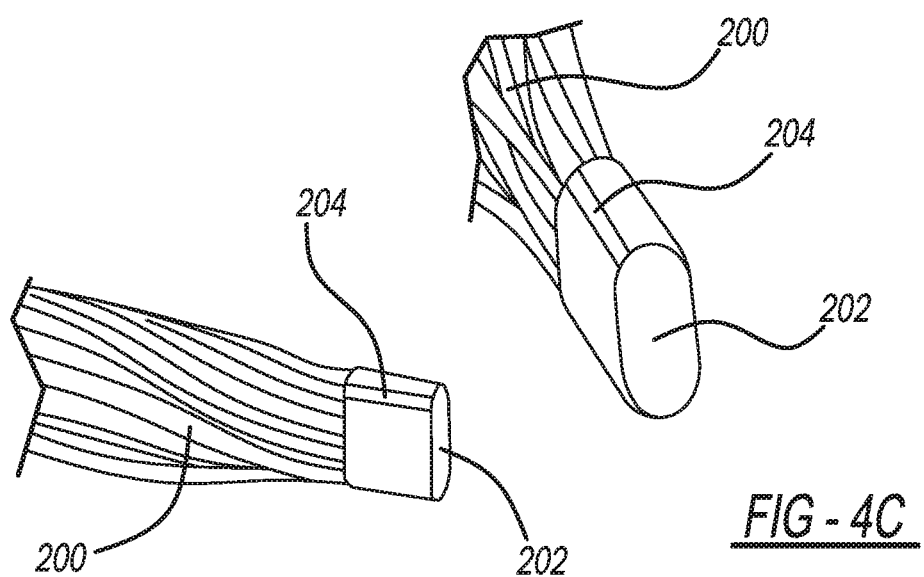

Referring to FIGS. 4A-4C, it was previously mentioned that the cables 131 and 127 each have a pair of cable ends. As stated previously, these cables 131 and 127 may be made up of a multistranded wire. The cable ends of these cables 131 and 127 may be consolidated using an ultrasonic welding process. In this example, the cable will be referred to as cable 200. However, it should be understood that the cable 400 is interchangeable with the cable 127, the cable 131 and/or a ground cable mentioned later in this description.

The cable 200 may be any type of conductive wire but generally is a multi-stranded copper wire. The cable 200 has at least one cable end 202. The strands of the cable 200 at the cable end 202 may be consolidated with each other via the use of the welding process. This welding process may be an ultrasonic welding process that welds the cable end 202 of the cable 200.

The shape of the welded cable end 202 may take any one of a number of different shapes. For example, the shape of the cable end 202 after welding may be a cube, cuboid, triangular prism, pentagonal prism, hexagonal prism, cylinder, and the like. Again, it should be understood that any type of shape could be utilized. Furthermore, the shape of the cable end 202 may have edges that are either sharp or rounded.

With a further focus on FIG. 4C, the cable end 202 of the cable 200 may also include a cap 404 that mates with the cable end 202 of the cable 200. The cap 204 is generally made of a conductive material, such as copper. As such, the cap 204 may be made of the same material as the cable 200 and may be formed from a tubular material. The cap 204 receives the cable end 202 of the cable 200. The cap 404 may be welded to the cable end 402 during the same ultrasonic welding step utilized to consolidate the cable end 402 of the cable 400 or may be welded in a two-step process, wherein the cable end 402 is consolidated together using an ultrasonic welding process and then the cap 204 is welded in a second ultrasonic welding process to the consolidated end 202 of the cable 200. Furthermore, the cap 204 may first be crimped using a crimping operation to the cable end 402 before ultrasonic welding of the cap 204 to the cable end 402 occurs.

The cap 204 can take any one of a number of different shapes. As such, the cap 204 may be a cube, cuboid, triangular prism, pentagonal prism, hexagonal prism, cylinder, and the like. Furthermore, as shown in FIG. 4C, the cap 204 may be an open-ended cap 204. As such, the cable end 202 may have a portion that extends through the length of the cap 204.

Accordingly, the cables 127, 131 and/or a ground cable may each have cable ends formed as stated above using an ultrasonic welding process.

The cable 127 has a cable end 137 that mates with the power block 152 of FIG. 3. However, as to the other end, the cable 127 has a second cable end 140 that connects to a power source through the power ball lug 350, as illustrated in figured 5A-5C. The second cable end 140 may be formed by ultrasonically welding a plurality of strands of wire that form the cable 127. This ultrasonic forming of the strands of wire may allow the other cable end 140 to take any one of a number of different shapes.

Additionally, the cable end 140 may be connected to the power ball lug 350. This connection to the power ball lug 350 may occur by ultrasonically welding the cable end 140 to the power ball lug 350. This ultrasonic welding of the cable end 140 may occur separately or may occur during the same operation as connecting the cable end 140 to the power ball lug 350.

Figure 5A:
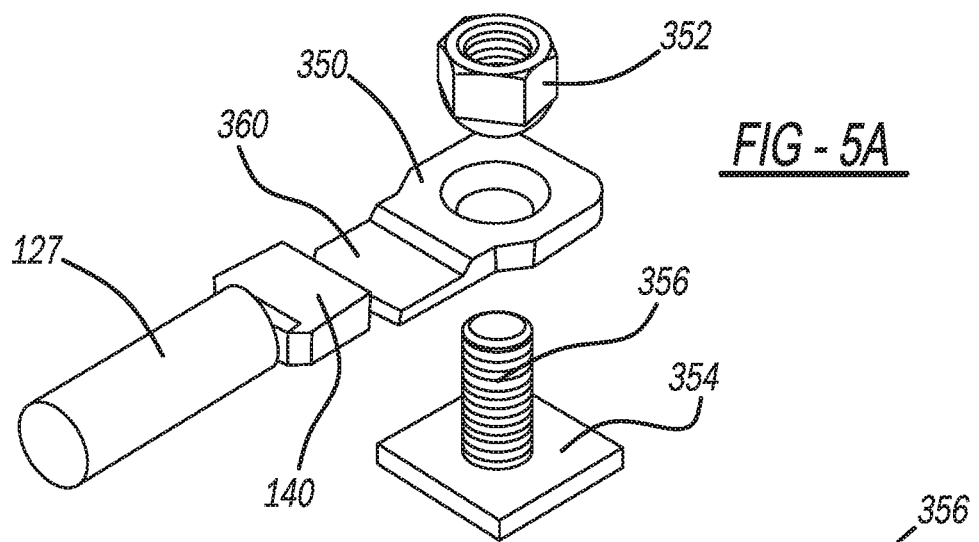
FIGS. 5A-5C illustrate a more detailed view of the connectors utilized for a cable of the MIG welding system.
Figure 5B:
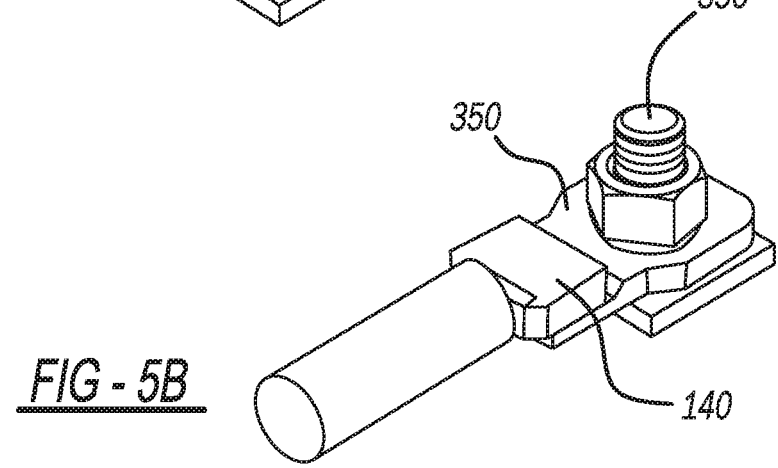
Figure 5C:
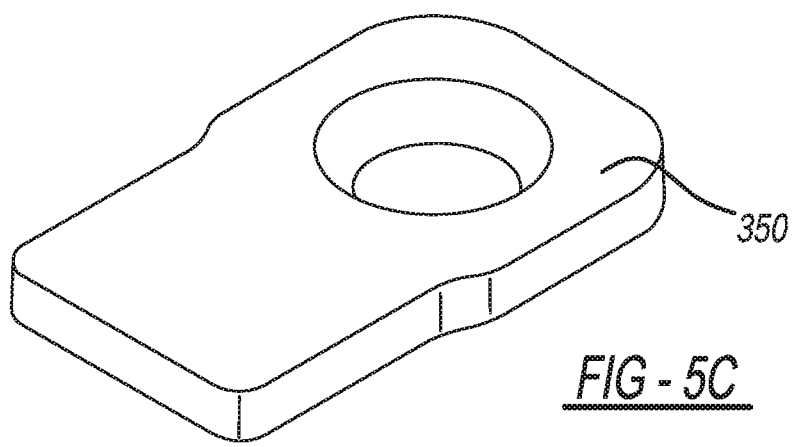
Figure 19:
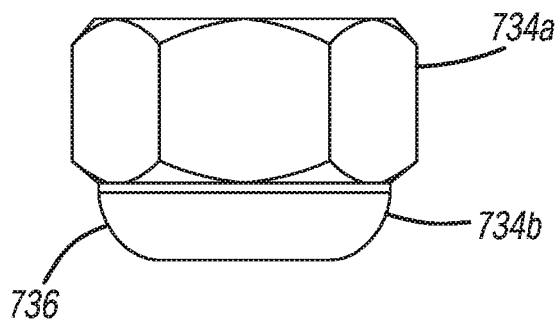
FIG. 19 is a front view of a ball nut.
Figure 20:
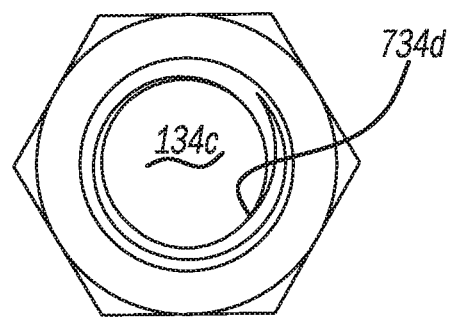
FIG. 20 is a top view of the ball nut of FIG. 19.
Figure 21:
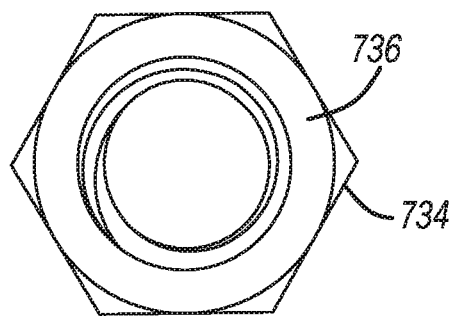
FIG. 21 is a bottom view of the ball nut of FIG. 19.
Figure 22:
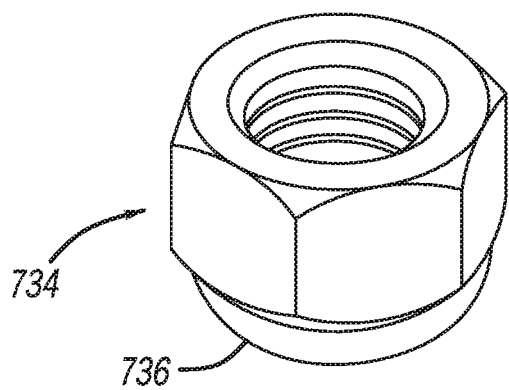
FIG. 22 is an isometric view of the ball nut of FIG. 19.

Once the consolidation has occurred, and the cable end 140 is attached to the power ball lug 350, a power ball nut 352 can then secure the power ball lug 350 to an electrical power source 354 using a stud 356 that is electrically in communication with the power source 354 and is configured to mate with the threads of the power ball nut 352. The power ball lug 350 may take any one of a number of different shapes. For example, as shown in FIG. 5, the power ball lug 350 is shown to have a substantially flat shape for receiving the cable end 140. However, as shown in FIGS. 5A and 5B, the power ball lug 150 has a small depression 360 wherein the cable end 140 specifically mates with it. Of course, it should be understood that the power ball lug 350 could take any one of a number of different shapes. Furthermore, the power ball lug 350 may be bent so as to allow a greater range of movement if necessary based on the application.

Referring to FIGS. 6-15, another example of a cable 614 is shown. The cable 614 further includes a second end 614a for being connected to the other of the power source or power receiver. The second end 614a of the cable 614 is terminated with the lug 630, 730, 830, 930 to permit connection with the input connector 616 of the welding system. The cable 614 is connected to the input connector 616 via the lug 630, 730, 830, 930, such that the second end 614a of the cable 614 connects to the lug 630, 730, 830, 930, and the lug 630, 730, 830, 930 connects to the input connector 616.

The second end 614a of the cable 614 may include an exposed wire portion 624 extending beyond the end of the jacket 622 at the second end 614a. The exposed wire portion 624, prior to being connected to the connection assembly 618, may be in the form of loose wires of the plurality of wire strands 620. The exposed portion 624 is not restrained or covered by the jacket 622.

The exposed wire portion 624 is configured to be bonded to the connection lug 630, 730, 830, 930 via ultrasonic welding. The general process of ultrasonic welding is known in the art. The components to be welded together are pressed together, typically via a press or horn that provides pressure on the components to hold them together. The components to be welded together may be placed in a fixture or on an anvil allowing a high-frequency vibration to be directed to the interface to be welded. An ultrasonic stack is tuned to resonate at the same ultrasonic frequency (for example between 15-40 kHz). An ultrasonic generator delivers a high power signal with a frequency matching the resonance frequency of the stack. The vibrating signal is applied to the components to be welded together, resulting in a solid state weld between the components.

The lug 630 may include a hole 634, through which a threaded projection 636 (FIG. 8) of the input connector 616 can extend when the connection assembly 618 is attached to the input connector 616. A nut 734 is sized and arranged to cooperate with the threads of the projection 636 to thereby attach the lug 630 to the input connector 616 when the nut is threaded down on the projection 636.

The exposed portion 624 of the cable 614 is configured to be ultrasonically welded to the lug 630. Thus, after the exposed portion 624 is welded to the lug 630, the cable will terminate at the lug 630, and the lug 630 may be attached to the input connector 616.

The cable 614 may be welded to the lug 630 in different ways, and the lug 630 may have different shapes or forms. In one approach, the lug 630 may include a flat base 630a, with a pair of lug tabs 630b extending upwardly from the base 630a to define a cavity 630c between the tabs 630b and above the base 630a.

The exposed portion 624 of the cable 614 may be disposed within the cavity 630c, such that the strands of the exposed portion 624 fill the bottom of the cavity 630c. Pressing the strands down into the cavity 630c will cause the strands to engage the base 630a, and will also cause the strands to splay outward and engage the inner walls of the tabs 630b. The strands may be pressed into the cavity 630c via the press of the ultrasonic welding device.

With the strands of the exposed portion 624 within the cavity 630c and pressed against the lug 630, the ultrasonic welding process will weld the strands to the base 630a of the lug 630, creating a solid weld. The ultrasonic welding of the strands to the lug 630 will consolidate the strands to create a quasi-solid consolidated wire bundle 640, as well as a solid bond between the bundle 640 and the lug 630. The bond between the bundle 640 and the lug 630 may be along the flat base 630a, or may also be disposed along the inner surface of the tabs 630b.

The ultrasonic welding further results in a lack of air pockets between individual strands 620 of the cable. The ultrasonic welding can be performed without special material preparation such as cleaning, as the process will remove and disperse oxidation, dirt particles, lacquer coating, and manufacturing oils that may be present. With the lack of air pockets, oxidation will not occur, and the welded connection between the bundle 640 and the lug 630 may outlast the life of the cable, unlike a traditional crimped connection that can loosen over time.

Upon completion of the ultrasonic welding, the lug tabs 630b may be crimped or bent over the top of the bundle 640. The lug 630 may then be connected to the input connector 616 by threading the nut onto the projection 636, providing a robust current path between the cable 614 and the input connector 616.

As described above, the exposed portion 624 is placed within the cavity 630c of the lug 630 prior to ultrasonic welding that creates the solid bundle 640 and the solid connection between the bundle 640 and the lug 630. However, in another approach, the bundle 640 may be created via ultrasonic welding prior to placing the bundle 640 in the lug 630. The bundle 640 and the lug 630 may then be subsequently welded together via ultrasonic welding.

With reference to FIGS. 8-11, as an alternative to the lug 630, a lug 730 may be used, which may also be referred to as a power block in this example. The power block 730 may have an end portion 730a and a second end portion 730b, and may have a generally elongated block-like shape.

The first end 730a may be configured to receive the exposed end portion 624 of the cable 614, similar to how the lug 630 received the end portion 624 between the tabs 630b. The power block 730 may include a main body 730c that defines a pair of walls 730d on opposite lateral sides of the body 730c and a base wall 730e at the first end 730a. The first end 730a also defines a first end opening 730f. The walls 730d and the base wall 730e combine to define a recess 730g in the first end 730a, with the opening 730f providing longitudinal access. The recess 730g is open at the top of the body 730c. Thus, the exposed portion 624 of the cable 614 may be placed into the recess 730g.

Similar to the above discussion regarding the lug, the exposed end portion 624 may be placed within the recess 730g and ultrasonically welded to the first end 730a of the power block 730. The wires of the exposed end may be placed within the recess 730g, and the wires may be welded to the power block 730 and may form the bundle 640 during the process of joining the cable 614 to the power block 730.

The second end portion 730b of the power block 730 is arranged to connect with the input connector 616 and may define a through-bore 732 between an upper and lower surface of the second end 730b. The bore 732 is configured to receive the threaded projection 636 of the input connector 760. In one approach, the through-bore 732 may have a diameter that corresponds to the outer diameter of the threaded projection 636 or may be slightly larger to account for manufacturing tolerances. In another approach, the through-bore 732 may have a diameter greater than the diameter of the threaded projection 636, allowing the power block 730 to shift relative to the threaded projection 636 during attachment.

An upper end of the through bore 732 may have a radiused inner surface 732b. The radiused inner surface 732b may be referred to also as spherical, hemispherical, rounded, curved, concave, or the like. The inner surface 732b faces away from the input connector 616 when the power block 730 is installed on the input connector 616. The inner surface 732b generally extends radially outward from the upper end of the through-bore 732 and upward from the upper end of the through-bore 732, such that the inner surface 732b will effectively transition into the through-bore 732. The radiused inner surface 732b extends up to an upper surface of the power block 730 and defines an upper opening of the through-bore 732.

The power block 730 may be secured to the input connector 616 via a ball nut 734 (FIGS. 19-22). The ball nut 734 includes an upper portion 734a and a lower portion 734b. The ball nut 734 further defines an opening 734c extending fully through the upper portion 734a and lower portion 734b. The opening 734c includes internal threading 734d extending along the length of the opening 734c. The threading is sized and arranged to correspond to the external threading of the threaded projection 636 of the input connector 616.

The upper portion 734a of the ball nut 734 may have a hexagonal shape or other shape known in the art to assist in transmitting torque to a nut. The lower portion 734b includes a radiused outer surface 736. The radiused outer surface 736 may also be referred to as spherical, hemispherical, rounded, curved, convex, or the like.

The radiused outer surface 736 is sized to correspond to the radiused inner surface 732b of the power block 730, such that the radiused outer surface 736 will be received within the space defined by the radiused inner surface 732b, with the surfaces 736 and 732b contacting each other. In one approach, the entire radiused inner surface 732b will be in contact with the radiused outer surface 736. In another approach, the radiused inner surface 732b will be substantially in contact with the radiused outer surface 136, although a portion of the radiused inner surface 732b may not be in contact.

The curvatures of the radiused inner surface 732b and radiused outer surface 736 may be the same in one approach. In another approach, the curvatures may be slightly different, but upon being seated against each other, the ball nut 734 or the power block 730 will deform slightly such that the curvatures match when an axial load is applied between them. The process of material deformation may also be referred to as swedging. The radiused surfaces that contact each other increases the surface area that is in contact between the ball nut 734 and the power block 730 relative to a non-radiused surface.

The power block 730, bundle 640, and nut 734 may all be made of a conductive material, such that current flowing through the cable 614 will flow through the bundle 640, power block 730, and nut 734 due to the contact between them. The bundle 640 and the power block 730 may be attached to each and in contact via the ultrasonic welding. The nut 734 is attached to and contacts the power block 730 at the interface between the respective radiused surfaces. The increased contact area increases the amount of current that may pass through the components.

With reference to FIGS. 8-11, in another approach, a lug 830 may be ultrasonically welded to the cable 614. The lug 830 may have a generally flat shape, similar to the lug 630, but without upwardly extending tabs. The lug 830 includes a first end portion 830a and a second end portion 830b. The first end portion 830a is configured for being attached to the bundle 640 of the cable 614 via ultrasonic welding. The second end portion 830b is configured for being attached to the input connector 616.

The first end portion 830a may include a reduced thickness relative to the second end portion 830b. The first end portion 830a may, therefore, define a first mounting surface 830c to which the bundle 640 of the cable 614 may be attached via ultrasonic welding. The mounting surface 830c is preferably flat and planar, thereby providing a flat surface against which the bundle 640 of the cable 614 may be pressed during the ultrasonic welding operation. The thickness of the first end portion 830*a* may be constant laterally across the first end portion 830*a*, such that there are no upwardly extending walls. Accordingly, the first end portion 830*a* may not include a walled cavity or recess into which the bundle 640 will be placed. Rather, the bundle 640, or the exposed wires of the cable 614, may be placed on top of the mounting surface 830*c* and then ultrasonically welded to the mounting surface 830*c*.

The second end portion 830*b* may have a thickness that is greater than the first end portion 830*a*. The second end portion 830*b* may also have a width that is greater than the first end portion 830*a* and mounting surface 830*c*, such that the second end portion 830*b* is in the form of a head portion. The second end portion 830*b* is configured for being attached to the input connector 616 of the welding system.

The second end portion 830*b* includes a through-bore 830*d* extending through the upper surface and the lower surface of the second end portion 830*b*. The through-bore 830*d* is configured for receiving the projection 636 of the input connector 616 therethrough to allow for the second end portion 830*b* to be attached to the input connector 616.

The second end portion 830*b* also includes a radiused inner surface 830*e* at the upper end of the through-bore. The radiused inner surface 830*e* may also be referred to as spherical, hemispherical, rounded, curved, concave, or the like. The concavity of the radiused inner surface 830*e* faces upwardly out of the lug 830, and away from the input connector 616 when attached.

The lug 830 may be attached to the input connector 616 via the ball nut 734 (previously described with reference to the lug/power block 730). The ball nut 734 includes the radiused outer surface 736. The radiused outer surface 736 may also be referred to as spherical, hemispherical, rounded, curved, convex, or the like.

The radiused outer surface 736 is sized to correspond to the radiused inner surface 830*e* of the lug 830, such that the radiused outer surface 736 will be received within the space defined by the radiused inner surface 830*e*, with the surfaces 736 and 830*e* contacting each other. In one approach, the entire radiused inner surface 830*e* will be in contact with the radiused outer surface 736. In another approach, the radiused inner surface 830*e* will be substantially in contact with the radiused outer surface 736, although a portion of the radiused inner surface 830*e* may not be in contact.

The curvatures of the radiused inner surface 830*e* and radiused outer surface 736 may be the same in one approach. In another approach, the curvatures may be slightly different, but upon being seated against each other, the ball nut 734 or the lug 830 will deform slightly such that the curvatures match when an axial load is applied between them. The radiused surfaces that contact each other increases the surface area that is in contact between the ball nut 734 and the lug 830 relative to a non-radiused surface.

To create the shape of the bundle 640 when attaching the wires of the cable to the lug 830 via ultrasonic welding, the lug 830 and wires may be placed within tooling for the ultrasonic welding process, where the tooling includes the side walls to create the block type shape of the bundle 640 after ultrasonically welding the wire ends of the cable 614 to the lug 830. After ultrasonically welding the cable 614 to the lug 830, the lug 830 remains solidly fixed to the bundle 640 that was created during the ultrasonic welding process.

With reference to FIGS. 16-18, in another approach, a lug 930, similar to lug 830, may be used. The lug 930 is similar to the lug 830 in that the lug has a generally flat and rectangular shape with a first end portion 930*a* and a second end portion 930*b*, with the first end portion 930*a* being configured for being attached to the end of the cable 614, and the second end 930*b* configured for being attached to the input connector 616.

The lug 930 may also include a mounting surface 930*c* disposed on the first end portion 930*a*. The first end portion 930*a* may have a reduced thickness at the location of the mounting surface 930*c*, similar to the lug 830. However, unlike lug 830, the first end portion 930*a* may include a recess 932 in which the mounting surface 930*c* is disposed, with the recess 932 defining a sidewall 932*a* extending upward from the mounting surface 930*c*.

The first end portion 930*a* and the second end portion 930*b* may have the same maximum width as well as the same maximum thickness. The widths may be reduced at rounded corners of the lug 930. The thickness at the first end portion 930*a* is reduced at the location of the recess 932 and mounting surface 930*c*.

Similar to the lug 830, the second end portion 930*b* includes a through-bore 930*d* extending through the upper surface and the lower surface of the second end portion 930*b*. The through-bore 930*d* is configured for receiving the projection 636 of the input connector 616 therethrough to allow for the second end portion 930*b* to be attached to the input connector 616.

The lug 930 may also include a radiused inner surface 930*e* at the upper end of the through-bore. The radiused inner surface 930*e* may also be referred to as spherical, hemispherical, rounded, curved, concave, or the like. The concavity of the radiused inner surface 930*e* faces upwardly out of the lug 930, and away from the input connector 616 when attached.

The lug 930 may be attached to the input connector 616 via the ball nut 734 described above. As described above, the ball nut includes the radiused outer surface 736. The radiused outer surface 736 is pressed against the radiused inner surface 930*e* to create an improved connection therebetween to improve current flow.

With reference to the lug 930, in one example, the lug 930 may have a length of 2.06 inches and a width of 1.25 inches. The lug 930 may have a thickness of 0.188 inches. The through-bore 930*d* may have a diameter of 0.531, and the outer diameter of the radiused inner surface 930*e* (at the upper surface of the lug 930) may be 0.750. The radiused inner surface may have a radius of 0.188. The recess 932 may have a width of 0.688 and a length of 0.625. The inner corners of the recess may have a radius of 0.125. The thickness of the lug 930 at the location of the recess may be 0.125, such that the recess has a depth of 0.063 from the upper surface of the lug 930.

With reference to the ball nut 734, the ball nut may have a hex head with a width of 0.75 between opposing flats. The nut 734 may have a height of 0.611. The radiused outer surface 736 may have a radius of 0.188, and a height of 0.174. At the bottom of the ball nut 734 and the bottom of the radiused outer surface 936, the ball nut 734 has an outer diameter of 0.515. The internal threading of the ball nut 734 may have an inner diameter of 0.422 and ½-13 threading.

It will be appreciated that the above dimensions are examples and that other dimensions could also be used for the lugs and ball nut described herein.

The above description has referred to a single end of the cable 614 being terminated via ultrasonic welding using the lugs 630, 830, 930 or power block 730, along with the ball nut 734 (or flat nut for a lug without a radiused inner surface) being used to connect to the input connector 616. The terminated end of the cable 614 can exist at both ends of the cable 614. One end of the cable 614 may include one of the above embodiments, with the other end of the cable 614 including that same embodiment or a different embodiment. The input connector 616 may be the power source from which the power and current are supplied, or the input connector 616 may be the end that receives the power and current that has been transferred via the cable 614 after being received from a power source.

The exposed end of the cable 614 that includes loose wires that are ultrasonically welding together can be ultrasonically welded prior to mating with a lug or other component. However, in the preferred approach, when attaching to a lug, the exposed end of the cable 614 is ultrasonically welded together along with the lug in a single welding process. In some cases, the lug 630 or power block 730 has tabs or walls that retain the loose wires of the end of the cable 614. In other cases, such as the lug 830 or 930, the sides of the exposed wire at the end of the cable 614 are open. In the case where the sides are open, the ultrasonic welding apparatus and tooling may provide the side walls that keeps the wires from splaying outward in response to a downward force from the ultrasonic welding horn when it is pressed against the anvil.

Typically, the lug will be placed on the anvil, and the horn will be pressed down on the exposed end of the cable 614, pressing the loose wires against the lug and providing the necessary vibrations to perform ultrasonic welding. At the conclusion of the ultrasonic welding process, the wires will form the bundle 640 and will be fixed to the lug 630, 830, 930 or power block 730, having the above-described benefits, such as a lack of air pockets and stronger connection and current path.

The exposed end of the cable 614 may also be ultrasonically welded into the bundle 640 without attaching it via ultrasonic welding to a lug or power block. In this approach, the bundle 640 can be shaped into a desired form, such as a block, based on the shape of the ultrasonic welding tooling. The resulting bundle 640 may be attached to other components of the welding system without ultrasonic welding, such as via a set screw, to connect to other conductive power transferring elements.

Moreover, the process of ultrasonically welding the end of the cable 614 can be used for other cable types where stranded wire is used, and is not limited to providing power to welding systems.

Having described the various components involved in terminating the end of the cable 614 via ultrasonic welding, the process will be described in additional detail.

The cable 614 may be provided having the wire strands 620 and the jacket 622. The jacket 622 may be peeled back or otherwise removed to expose the loose wire strands 620. The lug 630, 830, or 930 or power block 730 may be placed on an ultrasonic welding anvil and secured.

The exposed end portion 624 of the cable 614 is placed on top of the lug 630, 830, or 930 or power block 730. The horn of the ultrasonic welding system is pressed downward onto the end of the cable 614, pressing the end of the cable 614 against the lug 630, 830, or 930 or power block 830. The ultrasonic welding frequency is applied through the horn, causing the associated vibrations, and the strands of the wires of the cable 614 are bonded together and also bonded to the lug 630, 830, or 930 or power block 730.

At the conclusion of the ultrasonic welding process, the end of the cable 614 is in the form of the bundle 640, which is welded and bonded to the lug 630, 830, or 930 or power block 730. The bundle 640 and the lug 630, 830, or 930 or power block 730 may be removed from the ultrasonic welding system and is ready for connection to the input connector 616.

The lug 630, 830, or 930 or power block 730, having the end of the cable 614 attached thereto, may then be connected to the input connector. The lug 630, 830, or 930 or power block 730 is placed over the threaded projection 636 of the input connector 616, with the projection 636 extending upward out of the hole or through bore of the lug 630, 830, or 930 or power block 730. The ball nut 734 is then threaded onto the protrusion to retain the lug 830 or 930 or power block 730. In the case of the lug 630, or other lugs that may not have a radiused inner surface, a traditional nut with a flat bottom may be used instead of the ball nut 734.

The ball nut 734 is threaded downward along the protrusion of the input connector 616 and toward and into engagement with the radiused inner surface of the lug 830 or 930 or power block 730. The ball nut 734 will provide a compressive force on the lug 830 or 930 or power block 730, thereby pressing the lug 830 or 930 or power block 730 against the input connector. The corresponding radiused surfaces of the ball nut 734 and the power block 730 or lug 830, 930 will be pressed together and may swedge together, resulting in a shape change of one or both of the radiused surfaces, such that they are in direct contact across the overlapping radiused surfaces.

The opposite end of the cable 614 can be terminated in a similar manner and connected to an input connector 616 in the same manner or any other manner described in this specification, including the manners described in FIGS. 4A-4C. With the connection made between the terminated end of the cable 614 and the input connector 616, current and power may flow through the connection in an improved manner and with high efficiency.

The ultrasonically welded attachment points may be free from air pockets and resistant to a loosening of the connection, thereby providing a more efficient current transfer. Moreover, the cooperating radiused surfaces have an increased contact area between the ball nut and the lug/power block, and the swedging effect further increases the contact between the ball nut and the lug/power block, improving the current transfer.

Current may pass through the end of the cable 614, through the lug/power block 630, 730, 830, 930, through the ball nut 734, and through the projection 636 of the input connector 616. Current may also pass between the bottom surface of the lug 630, 730, 830, 930 and the surface of the input connector 616. However, the mated surfaces of the lug 630, 730, 830, 930 and the surface of the input connector 616 may be subject to oxidation, and the current path may degrade over time. The connection between the lug/power block 630, 730, 830, 930, the ball nut 734, and the projection 636 from the input connector 616 provides another path for the current in the event of degradation of the direct connection between the lug/power block 630, 730, 830, 930 and the input connector 616.

In one approach, the wire strands 620, the bundle 640, the lugs 630, 730, 830, 930, the ball nut 734, the projection 836, and the input connector 816 are each made of copper. However, other materials may also be used.

While the present invention has been described in terms of preferred embodiments and examples, it will be understood that the invention is not limited to the above-described embodiments and examples, as modifications may be made by those skilled in the art in light of the foregoing teachings.

What is claimed is:

1. A system for providing power for a welding system, the system comprising:
   a power cable having stranded wires, the power cable having a first end and a second end;
   wherein the stranded wires forming either the first end or the second end are consolidated, wherein the consolidated stranded wires are fixed together to define a bundle; and
   wherein one of the first end or the second end is connected to a power supply and the other end is connected to a power receiver of the welding system;
   a lug attached to the bundle, wherein the lug includes a first portion and a second portion, wherein an interface between the bundle and the first portion of the lug is free from air pockets;
   wherein the second portion of the lug defines a through-bore extending through the second portion, the through bore configured to receive a projection from a power source or a power receiver;
   wherein the lug defines a radiused inner surface at an upper end of the through-bore in the second portion, wherein the radiused inner surface has a concave shape facing upward;
   a ball nut, the ball nut having a lower portion including a radiused outer surface, the radiused outer surface having a convex shape facing downward, wherein the radiused outer surface of the ball nut is sized and arranged to mate with the radiused inner surface of the lug;
   wherein the ball nut includes internal threading sized to cooperate with the external threads of a projection from a power source or power receiver, such that the ball nut may be threaded onto the projection and will compress the radiused outer surface of the ball nut against the radiused inner surface of the lug; and
   wherein the radiused inner surface of the lug and the radiused outer surface of the ball nut have a different radius, and at least one of the radiused outer surface of the ball nut or the radiused inner surface of the lug is deformable in response to a compressive load exerted by the ball nut on the lug, such that a curvature of an interface between the ball nut and the lug is the same in response to the compressive load.

2. The system of claim 1, wherein the first portion of the lug includes a base and a pair of tabs extending upwardly from the base, wherein exposed wires of the bundle are disposed laterally between the tabs and above the base, wherein the tabs are bendable over the exposed wires.

3. The system of claim 1, wherein the lug defines a recess in a first portion with a mounting surface at a base of the recess and sidewalls on opposite sides of the recess, wherein the bundle is disposed within the recess.

4. The system of claim 1, wherein the first portion of the lug has a maximum thickness that is smaller than a maximum thickness of the second portion of the lug.

5. The system of claim 1, wherein the bundle and the first portion of the lug have the same width.

6. The system of claim 1, wherein the bundle has a width that is smaller than a width of a first portion of the lug, and an upper surface of the first portion of the lug is disposed above a lower surface of the bundle.

7. The system of claim 1, further comprising a cap, wherein the cap is coupled to the bundle.

8. The system of claim 7, wherein the bundle is formed via an ultrasonic welding process, and wherein the cap is coupled to the bundle via the same ultrasonic welding process that formed the bundle.

9. The system of claim 1, wherein the bundle is formed in the shape of at least one of a cube, cuboid, triangular prism, pentagonal prism, hexagonal prism, or cylinder.

10. The system of claim 1, wherein the bundle is formed via ultrasonic welding such that the bundle is free of air pockets.

11. A system for providing power for a welding system, the system comprising:
    a power cable having stranded wires, the power cable having a first end and a second end;
    wherein the stranded wires forming either the first end or the second end are consolidated, wherein the consolidated stranded wires are fixed together to define a bundle; and
    wherein one of the first end or the second end is connected to a power supply and the other end is connected to a power receiver of the welding system;
    a lug attached to the bundle, wherein an interface between the bundle and the lug is free from air pockets;
    wherein a first portion of the lug has a maximum thickness that is smaller than a maximum thickness of a second portion of the lug; and
    wherein the first portion of the lug has a constant lateral thickness across the entire lug.

12. The system of claim 11, wherein the bundle is disposed entirely above the lug.

13. A system for providing power for a welding system, the system comprising:
    a power cable having stranded wires, the power cable having a first end and a second end;
    wherein the stranded wires forming either the first end or the second end are consolidated, wherein the consolidated stranded wires are fixed together to define a bundle; and
    wherein one of the first end or the second end is connected to a power supply and the other end is connected to a power receiver of the welding system;
    a lug attached to the bundle, wherein an interface between the bundle and the lug is free from air pockets; and
    wherein a first portion of the lug defines a recess having a depth that is less than half of the maximum thickness of the lug, wherein the recess defines a mounting surface against which the bundle is attached.

14. The system of claim 13, wherein a second portion of the lug defines a through-bore extending through the second portion, the through bore configured to receive a projection from a power source or a power receiver.

15. The system of claim 14, wherein the lug defines a radiused inner surface at an upper end of the through-bore in the second portion, wherein the radiused inner surface has a concave shape facing upward.

16. The system of claim 15, further comprising a ball nut, the ball nut having a lower portion including a radiused outer surface, the radiused outer surface having a convex shape facing downward, wherein the radiused outer surface of the ball nut is sized and arranged to mate with the radiused inner surface of the lug.

17. The system of claim 16, wherein the ball nut includes internal threading sized to cooperate with the external threads of a projection from a power source or power receiver, such that the ball nut may be threaded onto the projection and will compress the radiused outer surface of the ball nut against the radiused inner surface of the lug.

18. The system of claim 17, wherein the radiused inner surface of the lug and the radiused outer surface of the ball nut have the same radius.

19. The system of claim 13, wherein the bundle is formed via ultrasonic welding such that the bundle is free of air pockets.

* * * * *